(12) United States Patent
Zajec et al.

(10) Patent No.: US 7,520,384 B2
(45) Date of Patent: Apr. 21, 2009

(54) ONE PIECE CONNECTABLE CASE FOR OPTICAL MEDIA

(76) Inventors: Zeljko Zajec, Industrijaska cesta 5, Sesvete (HR) 10360; Zoran Kefelja, Zuti dol 27, Zagreb (HR) 10000; Mladen Sercer, Kaciceva 16, Zagreb (HR) 10000

( * ) Notice: Subject to any disclaimer, the term of this patent is extended or adjusted under 35 U.S.C. 154(b) by 408 days.

(21) Appl. No.: 10/551,079

(22) PCT Filed: Apr. 28, 2004

(86) PCT No.: PCT/HR2004/000012

§ 371 (c)(1),
(2), (4) Date: Sep. 27, 2005

(87) PCT Pub. No.: WO2004/097833

PCT Pub. Date: Nov. 11, 2004

(65) Prior Publication Data

US 2007/0095683 A1 May 3, 2007

(30) Foreign Application Priority Data

Apr. 30, 2003 (HR) .............................. P20030344A

(51) Int. Cl.
*B65D 85/57* (2006.01)
(52) U.S. Cl. ..................... 206/308.1; 206/508; 206/512
(58) Field of Classification Search ............... 206/308.1, 206/308.3, 311, 312, 503, 508, 509, 511, 206/512
See application file for complete search history.

(56) References Cited

U.S. PATENT DOCUMENTS

| 4,903,829 | A | 2/1990 | Clemens | |
|---|---|---|---|---|
| 6,216,862 | B1 | 4/2001 | Chang | |
| 6,227,363 | B1 | 5/2001 | Lu | |
| 6,626,290 | B2 * | 9/2003 | Byrne et al. | 206/308.1 |
| 2004/0026274 | A1 * | 2/2004 | Bruet-Ferreol | 206/308.1 |
| 2004/0079656 | A1 * | 4/2004 | Hoogland | 206/307.1 |
| 2006/0054520 | A1 * | 3/2006 | Gelardi et al. | 206/308.1 |
| 2006/0185994 | A1 * | 8/2006 | Schuurs | 206/308.1 |

FOREIGN PATENT DOCUMENTS

EP 0086484 A 8/1983

* cited by examiner

*Primary Examiner*—Jacob K Ackun, Jr.
(74) *Attorney, Agent, or Firm*—David A. Guerra

(57) ABSTRACT

One-part case for digital records' carriers with possibility of connection with cases of the same type presented in FIGS. 1 and 7 and made of the polymeric material using the technology of injection moulding consists of the lower portion (1) and the upper portion (2) connected by one or more foldable joints (3). The portions of the case are fitted with elements which are used for interpositioning of the cases of the same type, in the form of spherical projections (7) and spherical indentations (8), and with elements for interconnecting of the cases of the same type, in the form of elastic consoles (4) and slots (6). The cases are joined into separable stacks of two or more cases of the same type by pressing the loose ends of the elastic consoles (4) of the open upper case into the slots (6) of the closed lower case. The stacked cases represent a single solid body within which there is no movement of the cases. The stack can be disassembled at any point by stretching the stack. The discs can be inserted into or released from the stacked case without having to separate the stacked cases by disassembling the connection for the locking of the individual respective case in the stack.

3 Claims, 5 Drawing Sheets

ONE PIECE CONNECTABLE CASE FOR OPTICAL MEDIA

CROSS-REFERENCE TO RELATED APPLICATIONS

This application is an U.S. national phase application under 35 U.S.C. §371 based upon co-pending International Application No. PCT/HR2004/000012 filed on Apr. 28, 2004. Additionally, this U.S. national phase application claims the benefit of priority of co-pending International Application No. PCT/HR2004/000012 filed on Apr. 28, 2004 and Croatia Application No. P20030344A filed on Apr. 30, 2003. The entire disclosures of the prior applications are incorporated herein by reference. The international application was published on Nov. 11, 2004 under Publication No. WO 2004/097833.

TECHNICAL FIELD

The invention refers to the cases for storing discs such as CDs, DVDs and the like, made of a single piece, which can be connected with others of the same type into stacks by means of engaging-releasing snapping connectors. The stacked cases can be transported as one solid body with the disks that can be inserted or taken out one by one without having to separate the cases.

According to the International Classification of Patents, the invention belongs to the following fields of technology:

G11B33/04—Cabinets, Cases, Shelves suitable for the storage of disc media.

B65D85/38—Containers, packing elements for optical devices or other sensitive measuring, or control devices.

TECHNICAL PROBLEMS

The digital recording media such as CDs, DVDs and other flat discs are stored for protection during transportation and usage into cases specially designed for these products. The disc storage cases with or without the discs are packaged and stored during transportation and usage at work into various packages, specially designed cabinets, on the shelves and in cases. Handling a great number of cases at workplaces and elsewhere by using the mentioned office accessories and furniture does not provide simple and economic solution to this problem. By introducing the additional equipment to handle these cases the problem is increased because of the larger space and longer time necessary to handle the equipment.

The invention solves the technical problems of the manufacture, transport and handling of the disc storage cases using the cases made of a single piece which can be interconnected without any additional linking elements, into stacks of various heights and separated from these, being at the same time suitable for transport and handling at work.

BACKGROUND ART

On the contemporary market there are no disc storage cases which could be connected together into stacks. The cases are commonly used in the form of low rectangular or square prisms of different thicknesses which are stored at workplaces into specially designed cabinets, on the shelves, racks and into cases.

In the literature on patents there have been no solutions offered for disc storage cases that may be interconnected into stacks.

The problem of handling a large number of cases at work and elsewhere has been solved by various versions of separable racks such as described in the patent documents NL9300261, EP1117098, WO02080177, WO0068950, DE19851972 and WO9613036. All the mentioned solutions are based on the application of different storage elements into which the cases are inserted, and which may be combined as necessary into vertical or horizontal stacks of various heights or lengths. These storage elements enable arranging of cases into vertical or horizontal stacks which are not suitable for transport since the cases inserted into the storage elements still have certain freedom of movement in the direction in which the cases are inserted and/or taken out from the storage elements, which allows the cases to fall out from these racks during transportation. Some of the mentioned racks are composed of the storage elements which are mounted one upon the other or one next to the other without being connected and without the possibility of disassembling the stacks in every direction.

The documents on patents WO920382, WO9222902 and GB2282524 describe the racks made of holding elements for disc storage cases interconnected by pivot around which they can rotate in order to access the single discs. These racks are not suitable for transportation since the storage elements and cases have the freedom of rotation around the rack pivot. The solutions mentioned in the state-of-the-art technology recognise the problem of handling the disc cases and indicate the method of solving it. The solution is a simple case such as a solid case which can be assembled without any additional connecting elements with the cases of the same type into relatively solid separable stacks of arbitrary height suitable for transportation and handling. It is precisely such a solution which has been provided in this invention.

ESSENCE OF THE INVENTION

According to the invention, the disc storage case has been made of polymeric material using the injection moulding technology. It consists of the upper holding plate and the lower holding plate which are interconnected by flexible folding joints, and on the inner sides of which there are indentations for the discs. The case is injection moulded while completely open, so that the plates are at one level. The finished case is closed by bending the upper plate towards the bottom plate, rotating the portions of the case around the folding joints one towards the other until their inner faying surfaces come into contact. The closed case is locked by the snapping separable link between the lower and the upper portions of the case, designed on the front part of the case.

The outer surfaces of the upper and the lower portion of the case are fitted with the elements for interpositioning of the cases during stacking. The outer surface of the lower portion is fitted with projections, and the outer surface of the upper portion is fitted with indentations for the positioning of two cases. The arrangement of the projections and indentations is such that the projections on the lower part of the upper case match the indentations on the upper part of the lower case. Two cases positioned one upon the other and correctly matched can be connected into a stack by means of the case interconnecting elements which form the snapping separable bonds.

The elements for interconnecting of the cases are designed in the corners of the square upper and lower portions of the case not covered by the disc placed into the case. The corners of the lower portion of the case are fitted with elastic consoles with bent loose ends, and the corners of the upper portion of the case are fitted with stepped slots. The arrangement of the elastic consoles and slots are such that the bent console ends on the lower portion of the upper case match the stepped slots of the upper portion of the lower case thus forming the snapping separable bonds. The bent console ends of the upper case are pressed into the slots of the lower case with the upper case open. Two closed cases connected to each other form a stack which mechanically represents one whole without the possibility of moving the cases in any direction. The bonding force that connects the two cases is greater than the multiple weight of one case so that the stack of several cases can be transported by holding the top case in the stacked set of cases. The stack of two connected cases can be disassembled manually stretching the stack by holding the bottom case with one hand and lifting the upper case with the other hand. This separates the snapping separable bonds formed by the elements for the interconnection of the cases. New cases can be added to or released from the stack at any position within the stack. The discs can be inserted into and taken out of the stacked cases without having to separate the stack of connected cases.

The simple, solid structure of the case and its maximal applicability as individual case and case which can be stacked with the cases of the same type suitable for handling and transportation make this case unique in the world.

DISCLOSURE OF THE INVENTION

The solid disc storage case that can be joined with cases of the same type is made of polymeric material by the technology of injection moulding as a single piece. The case is injection moulded while completely open so that all the parts of the case are at one level. The case consists of the lower portion 1 and the upper portion 2 which are connected by the flexible folding joints 3. The lower portion 1 and the upper portion 2 have approximately the shape of mirror-symmetrical thin square plates with rounded corners and rounded front sides. The lower portion 1 and the upper portion 2 are connected by one or several folding joints 3 at the rear sides into one whole. In the fully open position the folding joints 3 have the form of a short bridge which connects the lower portion 1 with the upper portion 2, and whose arc is the thinnest in the middle. The inner surfaces of the case portions are shaped so as to hold the round flat disc such as CD or DVD.

Figure 1:
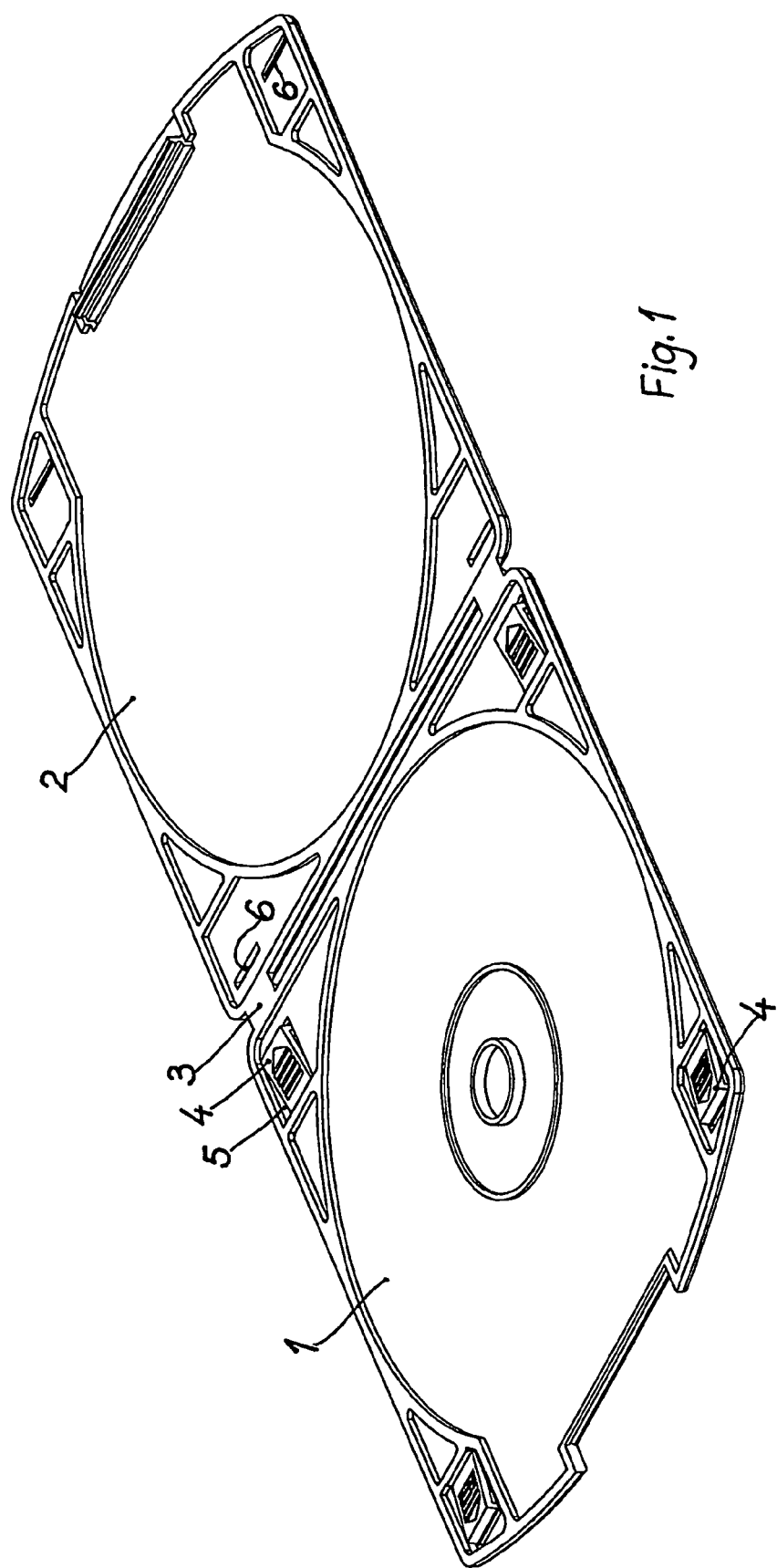
FIG. 1 shows a completely open solid case for digital information carriers with the view of the inner surfaces of the lower and upper portions of the case.
Figures 3, 4:
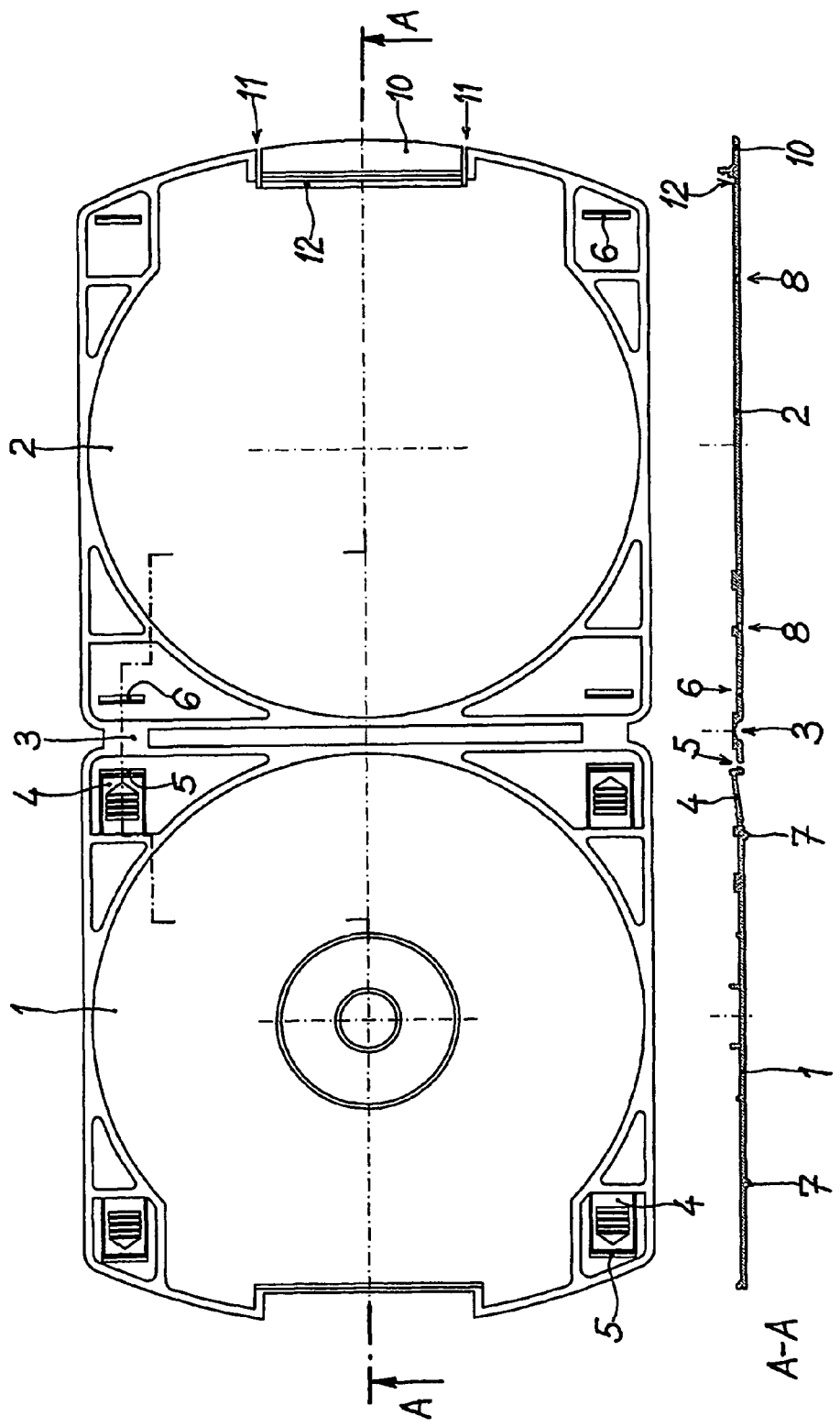
FIG. 3 shows the layout of the completely open solid case for digital information carriers with the view of the inner surfaces of the lower and upper portions of the case.
FIG. 4 shows the cross-section A-A of the case in FIG. 3.

The inside of the lower portion 1 shown in FIGS. 1, 3 and 4 is designed as a shallow round indentation imprinted in the square plate which, outside the round indentation, is fitted with a system of plate reinforcement ribs and a system of connecting elements. The middle of the inside of the lower portion 1 is fitted with an annular projection for holding and centering of the disc with the diameter slightly smaller than the diameter of the opening in the disc, and the height greater than the thickness of the disc. Concentrically to this projection, there is another annular projection for supporting the disc. The outer diameter of this projection is smaller than the smallest diameter of the active disc surface, and the height is such that the disc supported by this projection does not touch in any way the lower portion 1. The circular edge of the disc stored in the lower portion 1 is raised above the bottom of the indentation so that the disc can be easily released from the lower portion 1.

The corner surfaces of the lower portion 1 which are located between the annular ribbed part around the disc and the ribbed part along the edges of the rectangular plate are fitted with the elements for joining of cases in the form of elastic consoles 4. The elastic console 4 is a rectangular part of the lower portion 1 which is designed in such a way that the lower portion 1 is fitted with a slot 5 from the three sides of the elastic console 4 and this slot releases it from the connection with the lower portion 1 which is on the fourth side connected to the lower portion 1. The elastic console 4 is initially inclined at a slight angle towards the inner surface of the lower portion 1.

The inside of the upper portion 2 presented in FIGS. 1, 3 and 4, is shaped as a shallow round indentation imprinted in the square plate which is, outside the circular indentation, fitted with a system of ribs which reinforce the upper portion 2 mirror-symmetrical to the system of ribs for the reinforcement of the lower portion 1. The corner surfaces of the upper portion 2 which are between the annular ribs around the disc and the ribs along the edges of the square plate are fitted with stepped slots 6. The arrangement of the stepped slots 6 on the upper portion 2 of the case matches the mirror-symmetrical image of the bent ends of the console 4 on the lower portion 1 of the case.

The outer surfaces of the portions of the case are designed in such a way as to allow interpositioning of the cases during stacking and labelling the case contents.

Figure 2:
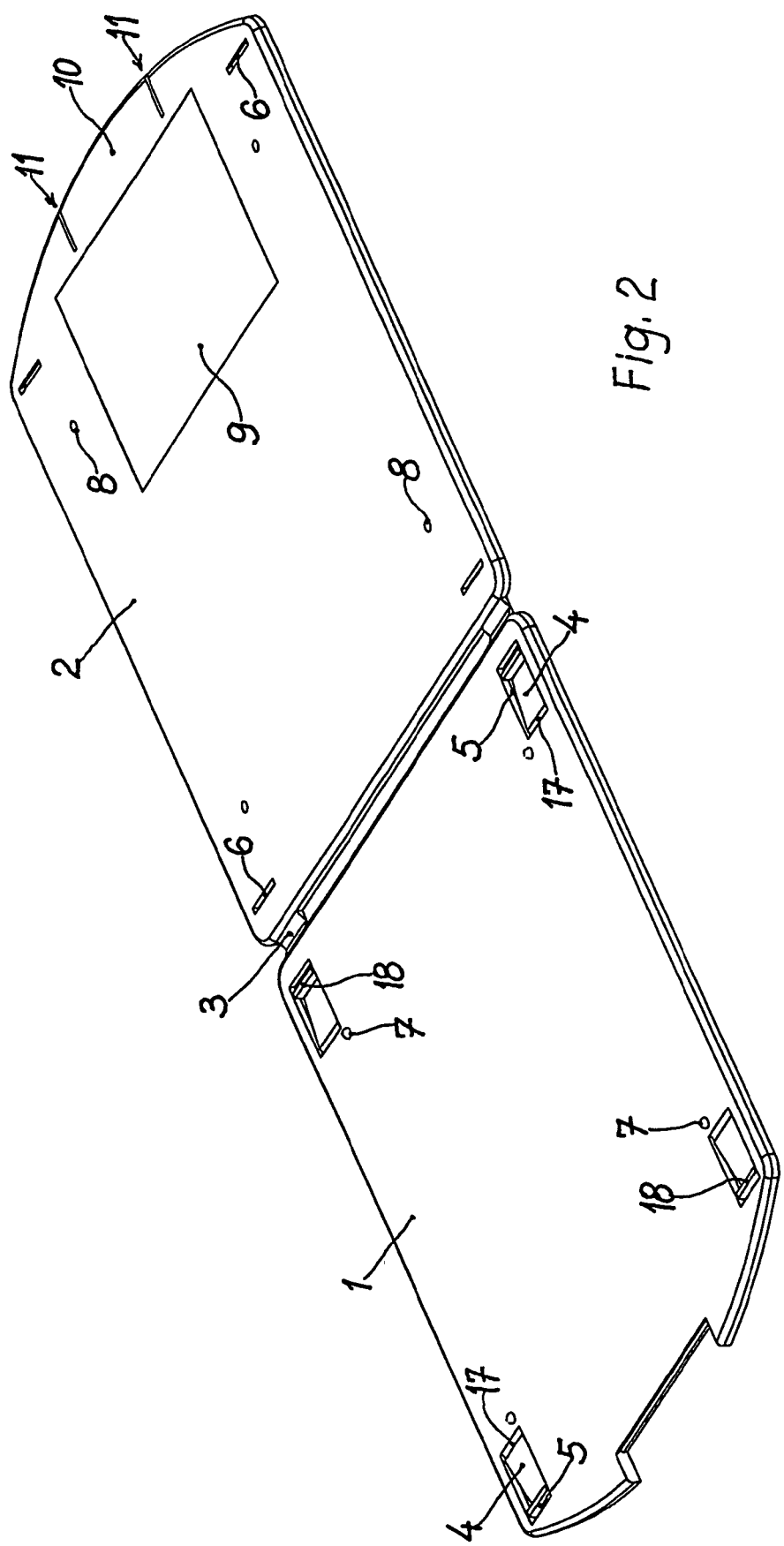
FIG. 2 shows completely open solid case for digital information carriers with the view of the upper and lower portions of the case.

The outer surface of the lower portion 1 presented in FIGS. 2 and 4, on the corner surfaces next to the elastic consoles 4, is fitted with the spherical projections 7, and the outer surface of the upper portion 2 presented in FIGS. 2 and 4 is fitted with the spherical indentations 8. The arrangement of the spherical projections 7 on the outer surface of the lower portion 1 of the case matches the mirror-symmetrical image of the spherical indentations 8 on the upper portion 2 of the case. The front part of the outer surface of the upper portion 2 is fitted with a shallow rectangular indentation 9 for the label with the information about the case contents.

The finished case is closed by folding the upper portion 2 towards the lower portion 1 by rotating the parts of the case around the folding joints 3 one towards the other until the ribbed surfaces of the upper portion 2 slip onto the ribbed surfaces of the lower portion 1.

Figure 5:
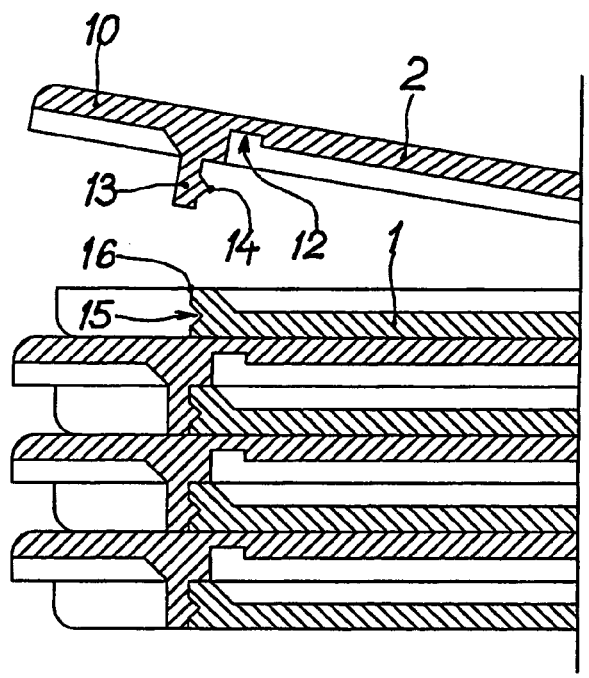
FIG. 5 shows the cross-section of a stack of several cases of the same type with details of locking and unlocking elements between the lower and the upper portions of the cases, fitted on their front sides.

The case is locked in place by the snapping engaging-releasing bond between the lower portion 1 and the upper portion 2 of the case, designed on the front side of the case which is presented in more detail in FIG. 5. This bond is formed by the elastic console 10 which in the upper portion 2 is formed by two lateral slots 11 and a transversal groove 12 on the upper portion 2 of the case. The transversal groove 12 on the inside of the upper portion 2 represents the weakening of the cross-section at the root of the elastic console 10 in which the elastic console 10 is folded during the locking and unlocking of the case. The whole breadth of the elastic console 10 is fitted with a vertical tang 13 with tooth 14. The front lateral side of the lower portion 1 is fitted with a groove 15. During locking and unlocking the tooth 14 engages and disengages from the groove 15 by sliding over the edge 16 due to the flexibility of the console 10 in the groove 12. The bonding force joining the locked portions of one case is greater than the multiple weight of one disc storage case so that a stack of several cases can be carried by holding the top case of the stacked cases. The case is unlocked by the momentum of force which is used to lift the loose end of the elastic console 10, bending it in the groove 12 disengaging the tooth 14 and the groove 15.

Figure 6:
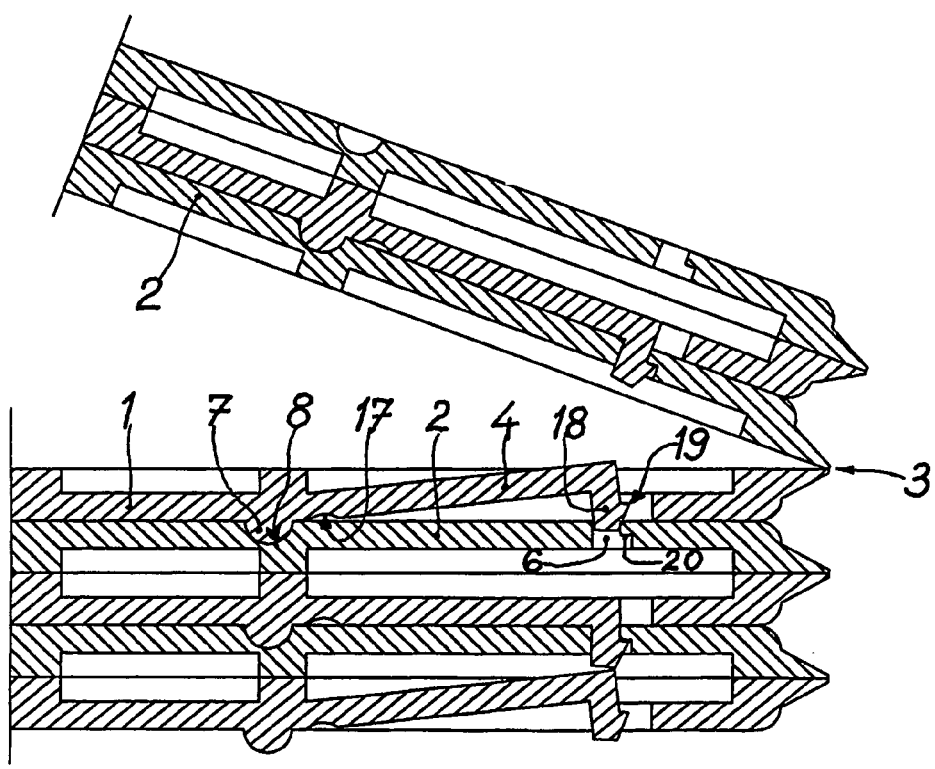
FIG. 6 shows the cross-section of a stack of several cases of the same type with details of the interpositioning case elements and details of elements for interconnecting of cases fitted to the rear side of the case.

Two and more cases of the same type can be joined into separable stacks using the elements for interpositioning and the elements for interconnection of cases presented in more detail in FIG. 6.

On a closed and locked case, another case is placed oriented in the same direction as the case onto which it is placed. The cases are positioned so that the spherical projection 7 on the lower portion 1 of the upper case is inserted into the mating spherical indentation 8 on the upper portion 2 of the lower case. After having positioned the two cases properly, these can be stacked by means of the elements for interconnecting of cases with the upper case which has to be open enabling access to the connecting elements.

Two correctly positioned cases are connected by elastic consoles 4 designed in the described way in the lower portion 1 of the upper case. The elastic console 4 which is initially inclined at a small angle towards the inside of the case can be elastically folded in the root which, due to the weakening of the cross-section, is fitted with the groove 17. The loose end of the elastic console 4 is bent at a right angle downwards so that it forms a low protruding element 18 with tooth 19. In case of correctly positioned cases the protruding element 18 of the elastic consoles 4 are located above the stepped slots 6 on the upper portion 2 of the lower case. The cases are joined by pressing the protruding element 18 of the elastic consoles 4 into the stepped slots 6 by folding the elastic consoles 4 at the root, and the teeth 19 are locked into step 20 in the slot 6. Two cases can be joined only while the upper case is open, which allows access to the elastic consoles 4.

Figure 7:
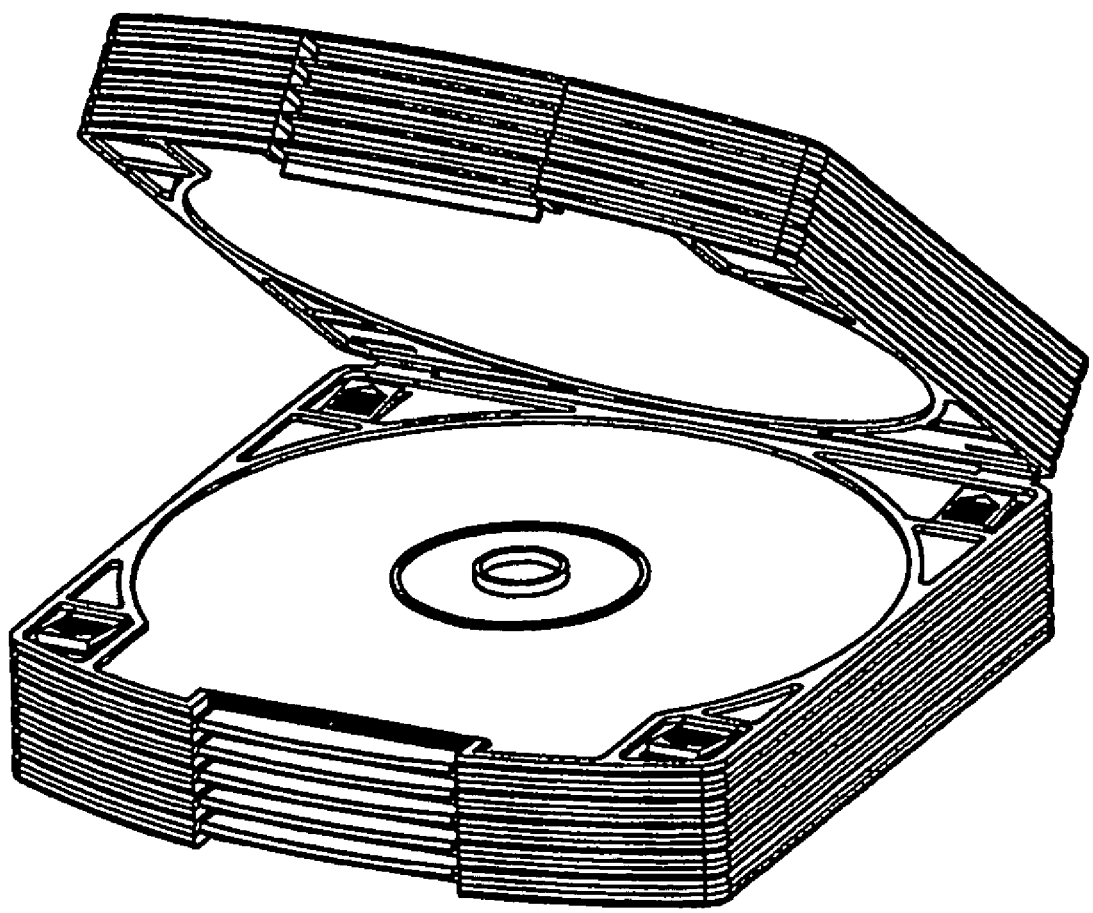
FIG. 7 shows a stack of several cases of the same type with one case open to access the disc stored in it and the case connecting elements.

In this way two or more cases of the same type can be joined into separable stacks as presented in FIG. 7, which are suitable for handling and transportation. Closed cases, with or without discs, stacked mechanically represent a solid body without the possibility of interrelated movements of cases in any direction. The bonding force connecting two cases is greater than the multiple weight of one case holding the disc so that the stack of several disc storage cases can be carried by holding the top case of the stacked cases. The stack can be separated at any point by manually stretching the stack, holding the lower case with one hand and lifting the upper case with the other hand. This results in separating of the snapping engaging-releasing bonds formed by the elements for interconnecting the cases. New cases can be added to or released from the stack at any position within the stack. The discs can be inserted into or taken out of the stacked case without having to disassemble the stack of the connected cases by separating the locking bond of any stacked case.

The invention claimed is:

1. One-part case for digital records' carriers with possibility of connection with cases of the same type comprising:
    a lower portion and an upper portion having the form of mirror-symmetrical thin square plates with rounded corners and rounded front sides, the lower and upper portion defining insides formed so as to hold circular flat discs;
    at least one folding joint flexibly connecting a rear part of the lower and a rear part of upper portions; and
    elastic consoles fitted to at least two corner surfaces of the lower portion of the case not covered by the discs, said elastic consoles being adapted for joining the cases of the same type, the elastic consoles being shaped as rectangular plates formed by slots defined on three sides thereof which releases it from the connection with the lower portion and a fourth side connected with the lower portion, a root of the elastic consoles being fitted with a groove, and whose loose end is bent at the right angle towards an outer surface of the lower portion so that it forms a low protruding element with a tooth and which is initially inclined at a small an angle towards the inside of the lower portion;
    wherein at least two corner surfaces of the upper portion of the case are fitted with slots with a step for joining the cases of the same type, which are mirror symmetrical by the protruding elements of the elastic consoles into which the protruding element can be inserted with the tooth of elastic consoles of other cases;
    wherein the outer surface of the lower portion comprising at least three spherical projections and the outer surface of the upper portion defining at least three spherical indentations for interpositioning of the cases, the indentations having a diameter equal to or greater than the spherical projections and mirror-symmetrical to the spherical projections;
    wherein a front side of the outer surface of the upper portion defining a shallow rectangular indentation for a label marking the contents of the case;
    wherein the front side of the upper portion is fitted with an elastic console formed by two lateral slots and a transversal groove and which is fitted with a vertical tang with a tooth, and on the front side of the lower portion of the case there is a groove below an edge;
    wherein the lower portion of the case and the upper portion of the case are locked by a snapping joint between the tooth and the groove.

2. The one-part case according to claim 1, characterized by, wherein the fact that it has been made of the polymeric material by the technology of injection moulding.

3. The one-part case according to claims 1 or 2, wherein the cases of the same type are connected manually into separable stacks of two or more cases of the same type using the spherical projections of the lower portion and the spherical indentations of the upper portion so that an upper case is oriented on a lower closed case in the same direction, wherein the spherical projections on the lower portion of the upper case are received into the spherical indentations on the upper portion of the lower case, and wherein the protruding elements with teeth at the loose ends of the elastic consoles of the upper open case are pressed into the mating stepped slots on the upper portion of the lower case.

* * * * *